June 21, 1927.

A. D. SIEVERS 1,633,232

CULTIVATOR BLADE

Filed Aug. 21, 1926

Inventor
August D. Sievers.
By
Attorneys

Patented June 21, 1927.

1,633,232

UNITED STATES PATENT OFFICE.

AUGUST D. SIEVERS, OF SOMERS, WISCONSIN.

CULTIVATOR BLADE.

Application filed August 21, 1926. Serial No. 130,695.

This invention relates to cultivator blades.

In cultivator blades as heretofore constructed, it has been found that the blade breaks the ground up in relatively large chunks and frequently tears the plant loose, or otherwise damages it, besides throwing the relatively large particles of earth over upon the plant.

This invention is designed to overcome the defects noted above, and objects of such invention are to provide a novel form of cultivator blade, in which a tail guard is provided for preventing large particles of earth from falling upon the plant, and which is so constructed that the relatively fine or powdered particles of earth are readily passed over towards the plant.

Further objects are to provide a cultivator blade which is so constructed that a vertical blade guards the plant from damage and permits breaking of soil close to the plant without any danger thereto, and which is so constructed that a tail guard prevents the plant from swinging outwardly until after the powdered dirt has been deposited adjacent the plant.

Further objects are to provide a novel form of cultivator blade, in which the parts are flat and may thus be readily cleaned and maintained in a smooth condition to secure the utmost ease of use.

An embodiment of the invention is shown in the accompanying drawings, in which.

Figure 1:
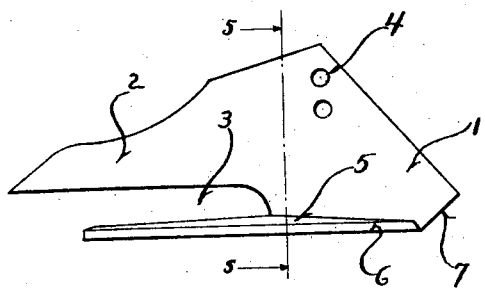
Figure 1 is a side view of the cultivator blade.
Figure 2:
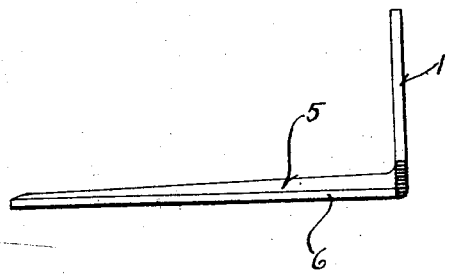
Figure 2 is a front view thereof.
Figure 3:
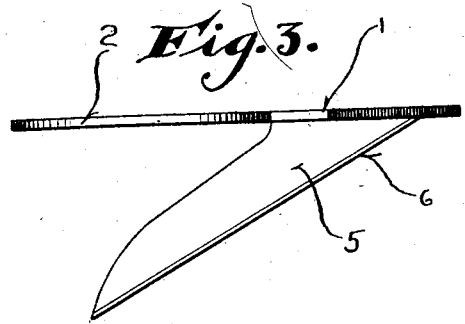
Figure 3 is a plan view.
Figure 5:
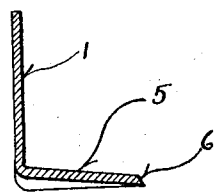
Figure 5 is a sectional view on the line 5—5 of Figure 1.

Referring to the drawings it will be seen that the cultivator blade consists of a vertical blade 1 which extends rearwardly and forms a tail guard 2. This tail guard is cut away, as indicated at 3, to permit passage therethrough of the fine particles of earth. The blade is provided with a plurality of apertures 4 for attachment to the projecting arm of the cultivator. From the blade 1 an outwardly extending cutter blade 5 projects and it will be noted particularly from Figures 1, 2, and 5, that the blade 5 slants downwardly towards its forward edge. Further, from reference to Figure 3, it will be noted that the blade 5 is provided with a slanting forward edge 6 which is beveled and which extends outwardly and rearwardly from the front edge of such blade. Further this blade is cut away at its rear, as shown in Figure 3, to permit free passage thereover of the powdered and broken soil.

It is to be noted further that the vertical blade 1 is rearwardly and downwardly slanted adjacent its front end, as indicated at 7, so that it may ride over the ground and allow cutting of the ground to start at the extreme front end of the edge 6 of the cutting blade.

Figure 4:
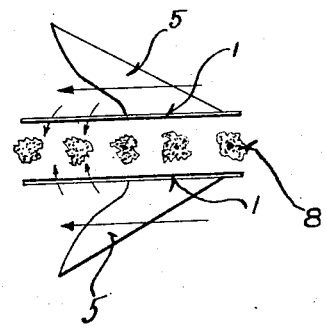
Figure 4 shows a right and left hand cultivator blade in the position they occupy with reference to the plants.

In operation the cultivator blades are preferably made right and left hand, as shown in Figure 4, and are secured to the brackets in the usual manner. They may be set closely adjacent the plants 8, as shown in such figure. When they are drawn across the field (to the right in Figure 4) the soil travels in the direction of the arrows over the cutting blade 5. The vertical blade 1 has a portion set in advance of the cutting blade 5 and consequently pushes the plant leaves and branches out of the way prior to the arrival of the cutting blade 5. Further it holds the plants out of danger and also it is to be noted that the tail guard 2 prevents relatively large chunks of earth from falling over against the plant. As a matter of actual operation the fine earth travels in the direction indicated by the small arrows in Figure 4 and falls inwardly through the opening 3 of the vertical blade below the tail guard. This fine earth thereafter passes over towards the plant.

It is to be noted that the forwardly and downwardly slanting cutter blade provided with the beveled front edge readily cuts across roots, weeds, and other undesirable plants, and is easily maintained in the correct digging position when the vertical blade is secured to the cultivator bracket.

Further it is to be noted that the tail guard 2 extends rearwardly a material distance, and consequently guards the plants against damage until after the cutter blade has completely passed.

It will be seen that the cutter blade and the vertical blade are made integrally and are preferably made of sheet metal of the requisite temper to retain a suitable cutting edge.

It will be seen further that the surfaces are all flat and consequently the vertical and the cutter blades may be maintained in a polished and cleaned condition with the utmost ease.

It will be seen further that the cultivator blade may be very cheaply manufactured from standard stock and may be easily applied to conventional types of cultivator brackets.

Although the invention has been described in considerable detail, such description is intended as illustrative rather than limiting as the invention may be variously embodied and as the scope of such invention is to be determined as claimed.

I claim:—

1. A cultivator blade comprising a vertical blade having a forwardly extending portion and having a relatively long rearwardly extending tail guard provided with a cutaway lower portion, a cutter blade extending laterally from said vertical blade, said cutter blade having a downwardly slanting body portion and having a rearwardly slanting cutting front edge, said tail guard having a lower edge spaced upwardly above the cutter blade, whereby said cutter blade will break earth and the vertical blade will guard the plant from damage while the flat cutaway portion of the tail guard will permit the passage therethrough of only relatively fine powdered earth.

2. A cultivator blade comprising a vertical blade and a cutter blade formed integrally, said cutter blade having a rearwardly and outwardly slanting front edge, said vertical blade having a portion projecting beyond the extreme front end of the cutter blade and having a rearwardly extending tail guard provided with a lower cutaway portion, the lower edge of the tail guard being spaced upwardly a slight distance above the cutter blade, whereby said tail guard preventing relatively large chunks of earth from falling past the vertical blade and will permit finely powdered earth to pass below its lower edge, said vertical blade having means for attachment to a cultivator bracket.

In testimony that I claim the foregoing I have hereunto set my hand at Somers, in the county of Kenosha and State of Wisconsin.

AUGUST D. SIEVERS.